(12) United States Patent
Wilkins et al.

(10) Patent No.: US 9,878,851 B1
(45) Date of Patent: Jan. 30, 2018

(54) PICK AND PASS CONVEYOR WITH FULLY ROTATABLE TRANSMISSIONS

(71) Applicant: Intelligrated Headquarters, LLC, Mason, OH (US)

(72) Inventors: John Joseph Wilkins, Erlanger, KY (US); Kevin Lawrence Klueber, Indian Springs, OH (US); Timothy W. Kraus, Cincinnati, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 19 days.

(21) Appl. No.: 14/523,889

(22) Filed: Oct. 25, 2014

Related U.S. Application Data

(60) Provisional application No. 61/895,976, filed on Oct. 25, 2013.

(51) Int. Cl.
*B65G 47/53* (2006.01)
*B65G 47/00* (2006.01)
*B65G 47/22* (2006.01)
*B65G 37/02* (2006.01)

(52) U.S. Cl.
CPC .................................. *B65G 37/02* (2013.01)

(58) Field of Classification Search
None
See application file for complete search history.

(56) References Cited

U.S. PATENT DOCUMENTS

| | | | | |
|---|---|---|---|---|
| 3,701,412 A | * | 10/1972 | Wriedt | B65G 13/00 198/689.1 |
| 4,456,116 A | * | 6/1984 | Jarman | B65G 13/00 193/35 MD |
| 6,694,220 B1 | * | 2/2004 | Tanz | B65G 1/0478 198/369.4 |
| 8,387,919 B2 | * | 3/2013 | Huber | B64C 1/20 244/118.1 |

* cited by examiner

Primary Examiner — Kavel Singh
(74) Attorney, Agent, or Firm — Alston & Bird LLP

(57) ABSTRACT

A transmission for driving articles can drive the articles in any direction up to nearly 360 degrees from a first direction of motion of the article while maintaining the input constant. The transmissions can be used in connection with material handling systems to convey articles to desired locations. Conveyor sections may have a plurality of such transmissions whose orientations are controlled as a group or individually.

23 Claims, 19 Drawing Sheets

PICK AND PASS CONVEYOR WITH FULLY ROTATABLE TRANSMISSIONS

CROSS REFERENCE TO RELATED APPLICATIONS

The present application hereby claims the benefit of the following provisional patent application of the same title: Ser. No. 61/895,976 filed on Oct. 25, 2013. It along with non provisional patent application entitled TRANSMISSION HAVING VARIABLE OUTPUT ORIENTATION having Ser. No. 14/063,400 filed on Oct. 25, 2013, the disclosures of which are hereby incorporated by reference in their entirety

BACKGROUND

The present disclosure relates generally to transmissions, and is particularly directed to a transmission in which the output orientation can be varied. The innovation will be specifically disclosed in connection with material handling systems utilizing such variable output orientation transmissions for conveying articles.

Typically the output of a mechanical transmission has a fixed orientation relative to the orientation of the input. Occasionally, though, in many situations there is a need to vary the output orientation relative to the input orientation. One such situation arises with material handling systems.

With material handling systems, it is known to utilize a conveyor to transport a succession of articles along a desired path, to merge or combine a plurality of conveying paths to fewer paths, or to selectively direct articles to respective desired or selected locations or desired paths. For example, sortation conveyors in which articles may be selectively conveyed from the sortation conveyor onto another conveyor or to a desired intermediate or ultimate location by pushers, arms, and pop up wheels, cross belts, tilt trays or other suitable structures. Configurations in which articles are selectively directed to one of a plurality of paths from a single conveyor include pick and pass, carton sequencing, work cell and single sort to multiple location configurations. Other examples include aligning conveyors, switching conveyors and merging conveyors. Conveyors are also used to engage sides of articles being transported.

Many different configurations are known for the conveying surface of a single conveyor, such as an endless conveying belt, moving slats or tubes, cross belts, tilt trays, and rollers to name a few. An example of rollers includes elongated cylindrical rollers which may be self-driven, such as a motorized drive roller, or driven by an underlying endless belt urged into contact with the rollers. Another example of rollers include individual spaced apart wheels having a small width relative to their diameters which may also be driven by an underlying endless belt urged into contact with the wheels. The circumference of such rollers may be flat, i.e., cylindrical, or arcade which may have a constant radius, i.e., spherical, or may not.

It is known to configure the conveyor system to be capable of selectively directing articles from the conveying surface so as to following one of a plurality of paths therefrom. Examples of such configurations include a pusher and swinging arm to engage the article and push it sideways. For moving slats or tubes, a traveling pusher configuration may be used. Crossbelt and tilt tray conveyors have individual sections that move as the conveyor and which are selectively actuated to cause the article thereon to move laterally until being discharged therefrom. Conveyors of wheels or elongated rollers may have conveying structures interposed therebetween at divert locations to cause the article to travel laterally to the desired path. In most such configurations, the conveying structures can drive articles either on the straight ahead path, or can divert or rotate the path up to about 90 degrees to either side of the straight ahead path. Rotation much beyond the +/−90 degree range can cause interference between components of the conveying structures, and may reduce the life of the components therein.

Although one or more embodiments will be described herein in connection with variable output orientation transmissions used in material handling systems, it will be understood that the present innovation is not limited in use or application thereto. The teachings of the present innovation may be used in any application in which variable output orientation transmissions may be beneficially used.

BRIEF DESCRIPTION OF THE DRAWINGS

The accompanying drawings, which are incorporated in and constitute a part of this specification, illustrate embodiments of the innovation, and, together with the general description of the innovation given above, and the detailed description of the embodiments given below, serve to explain the principles of the present innovation.

Figure 1:
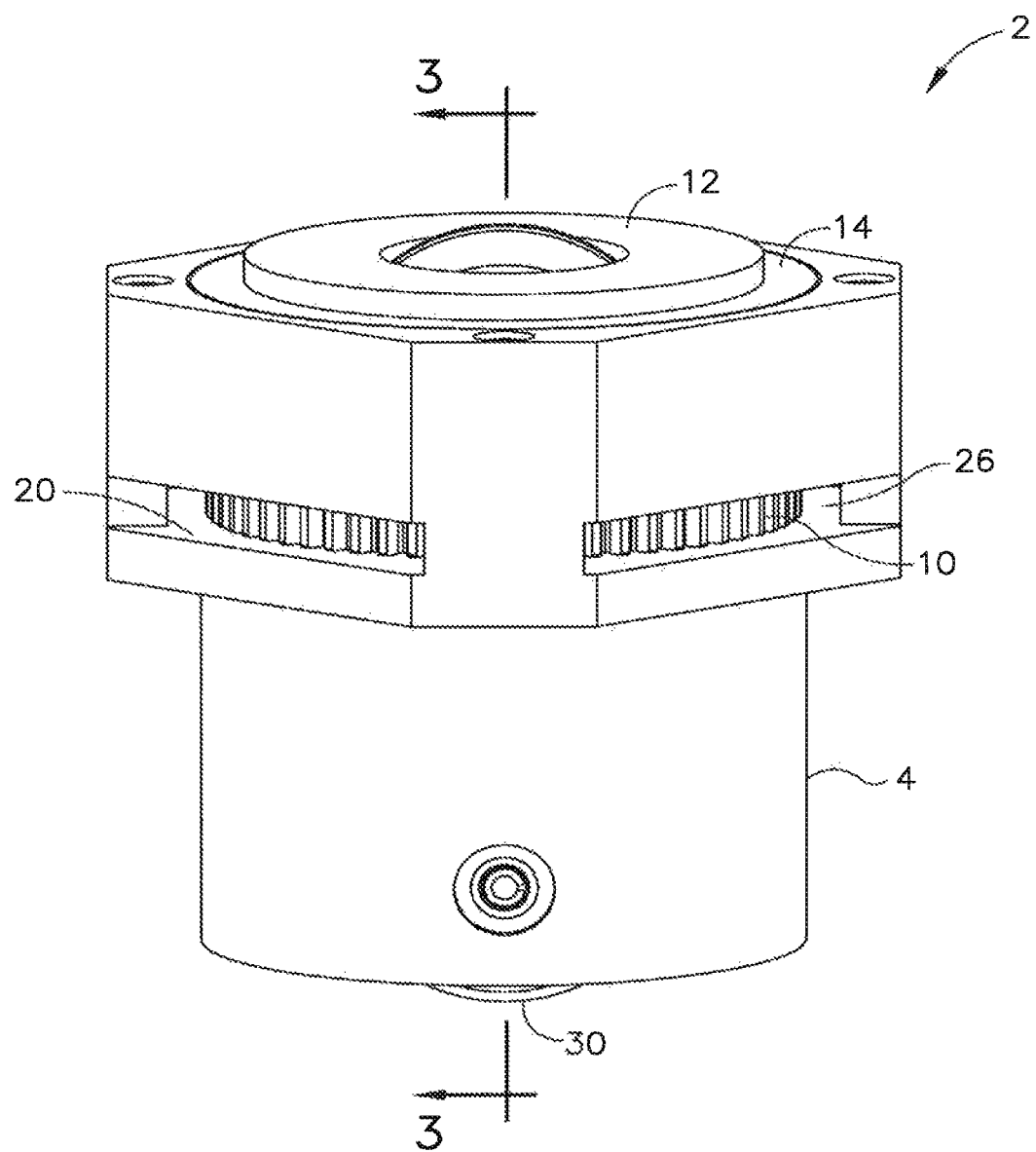
FIG. 1 is a side perspective view of a variable output orientation transmission constructed in accordance with the teachings of the present innovation.
Figure 2:
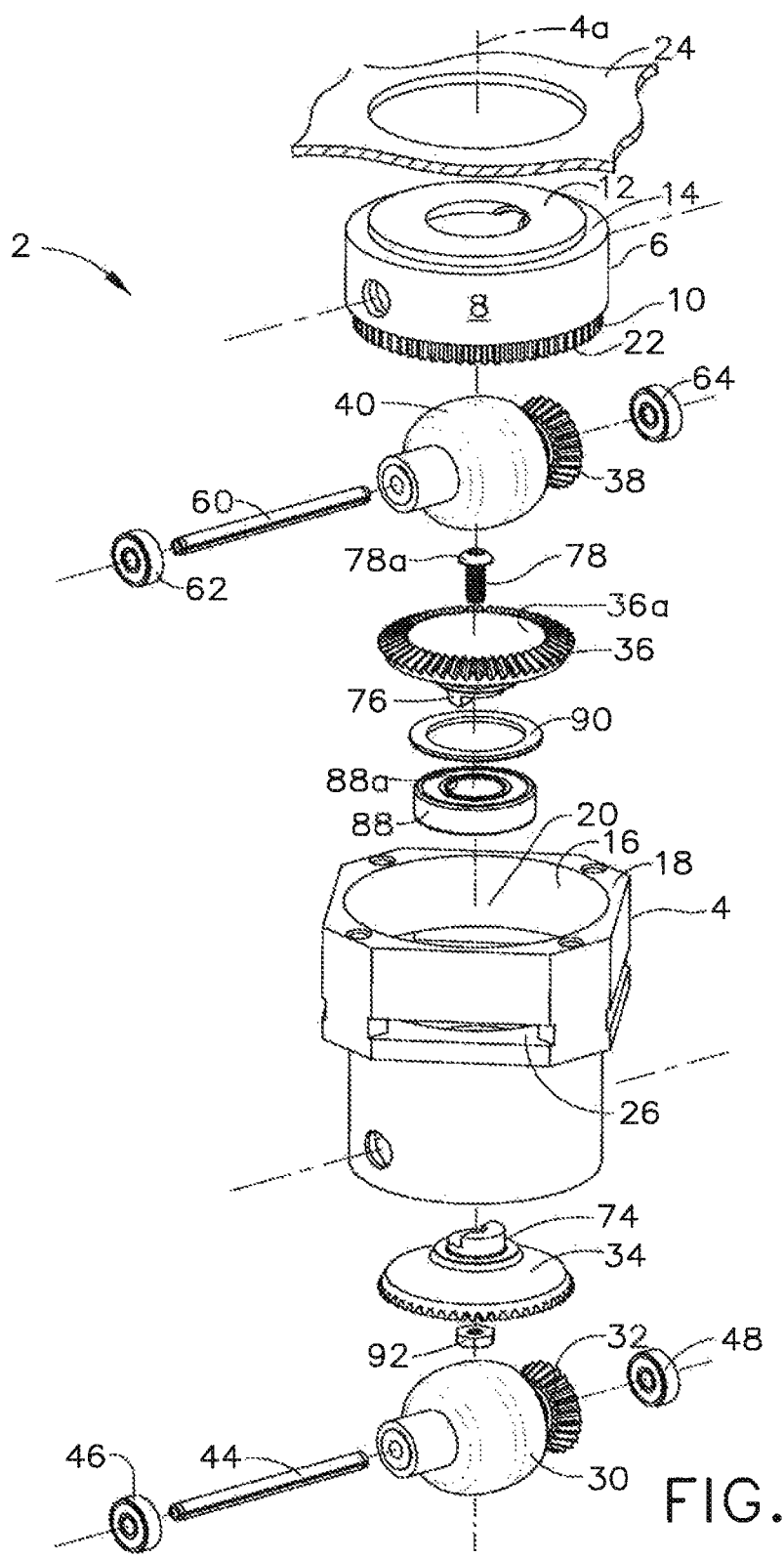
FIG. 2 is an exploded perspective view the transmission of FIG. 1.
Figure 3:
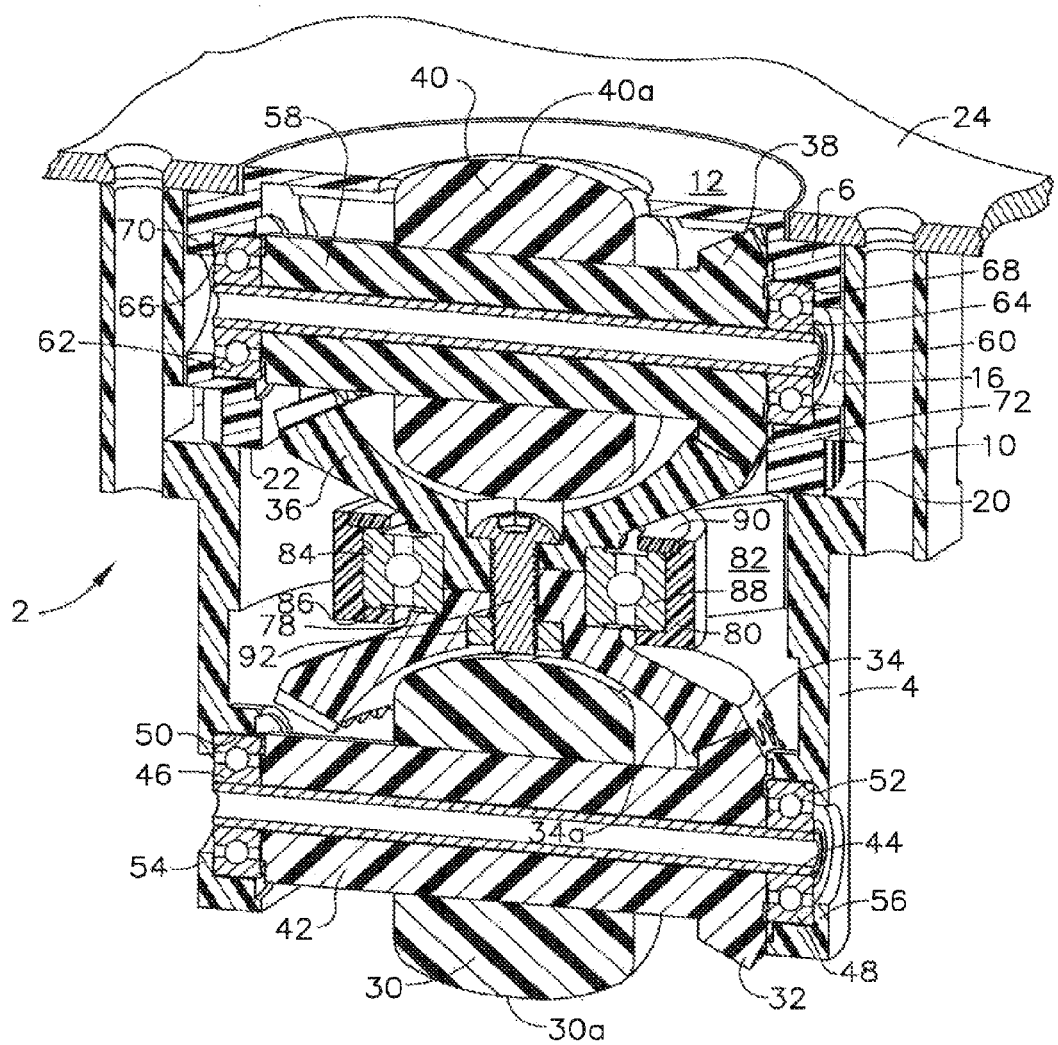
FIG. 3 is cross-sectional perspective view of the transmission of FIG. 1 taken along line 3-3 of FIG. 1.
Figure 4:
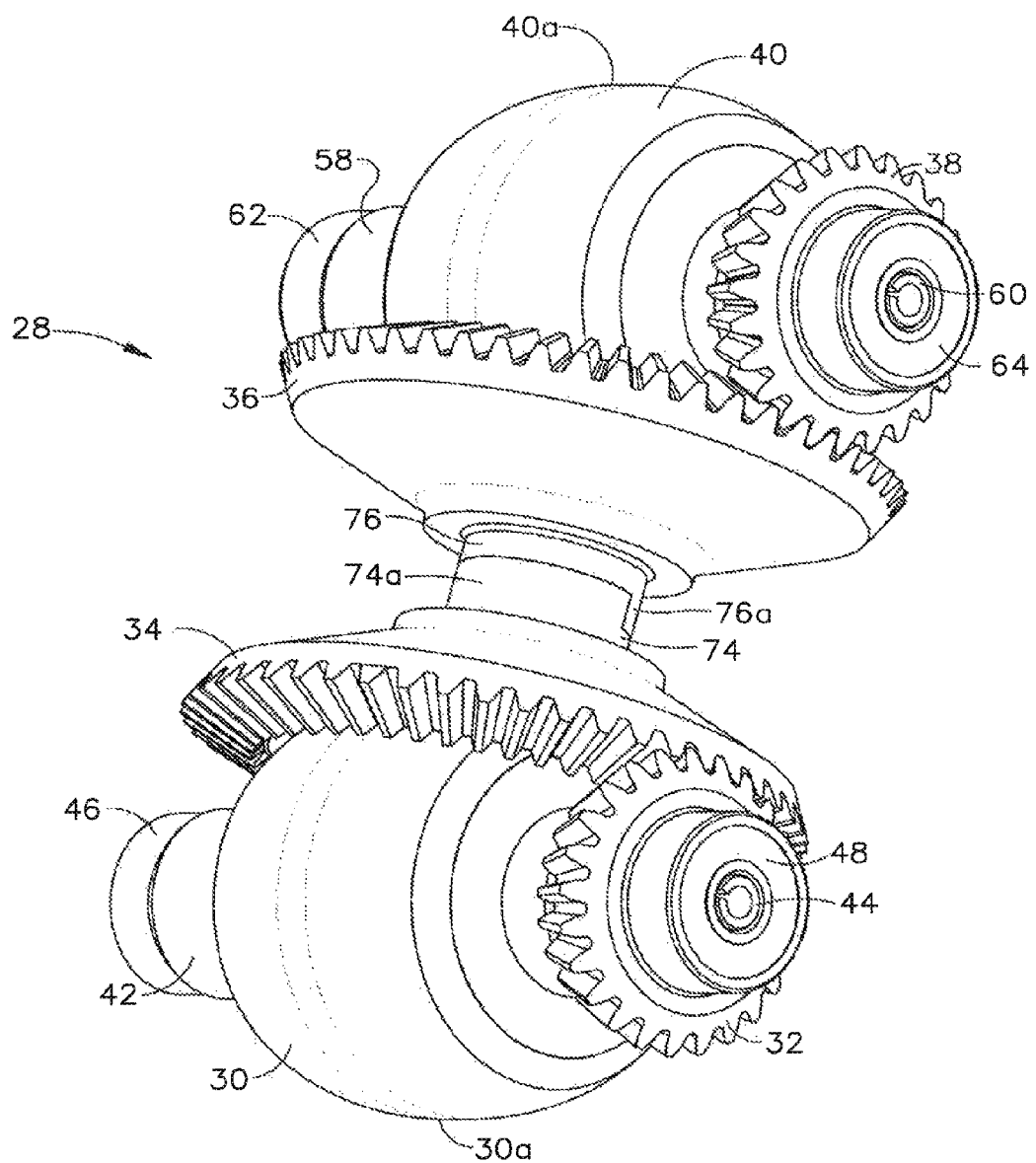
FIG. 4 is perspective view of the drive train of the transmission of FIG. 1.
Figure 5:
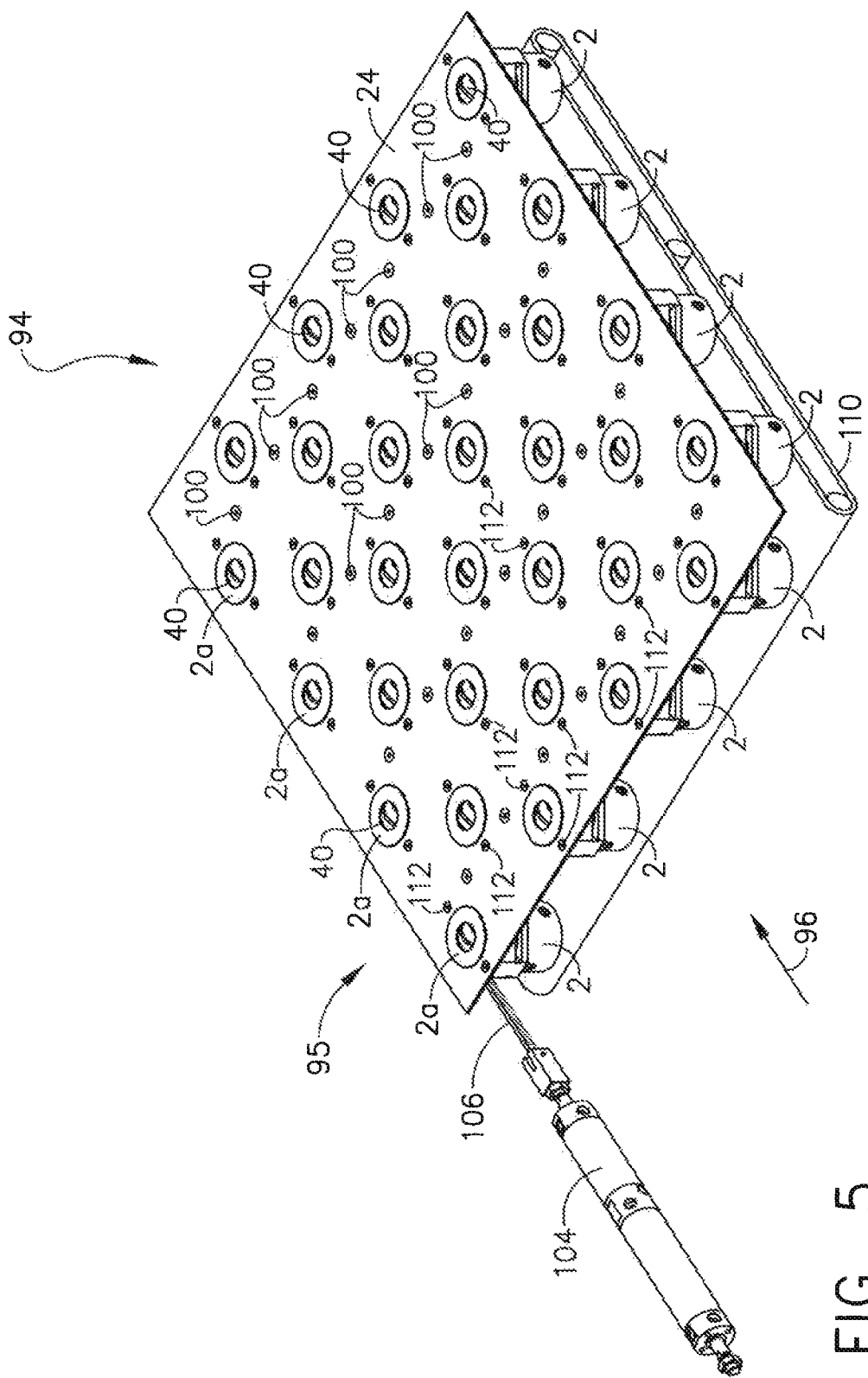
FIG. 5 is a perspective view of a conveyor section comprised of a plurality of variable output orientation transmissions of FIG. 1.
Figure 6:
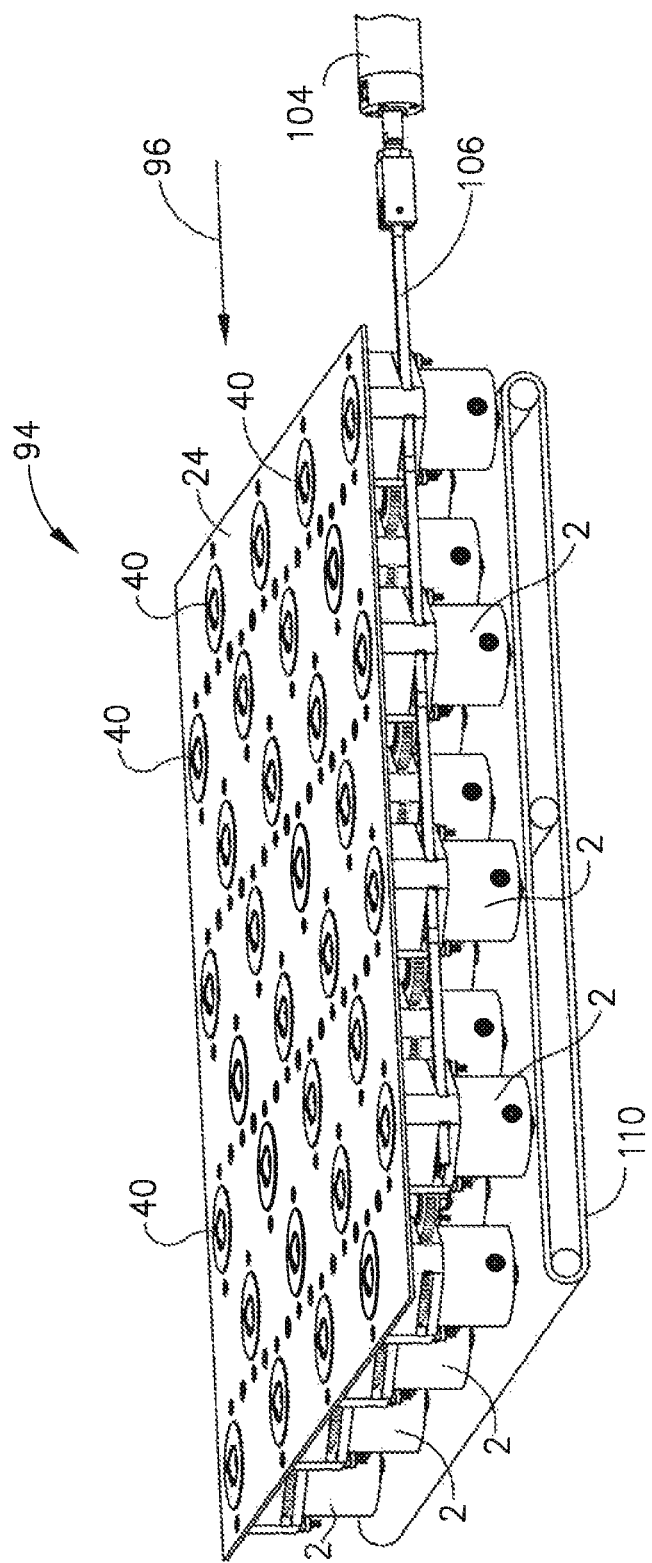
FIG. 6 is perspective view of the conveyor section of FIG. 5 viewed from different angle.
Figure 7:
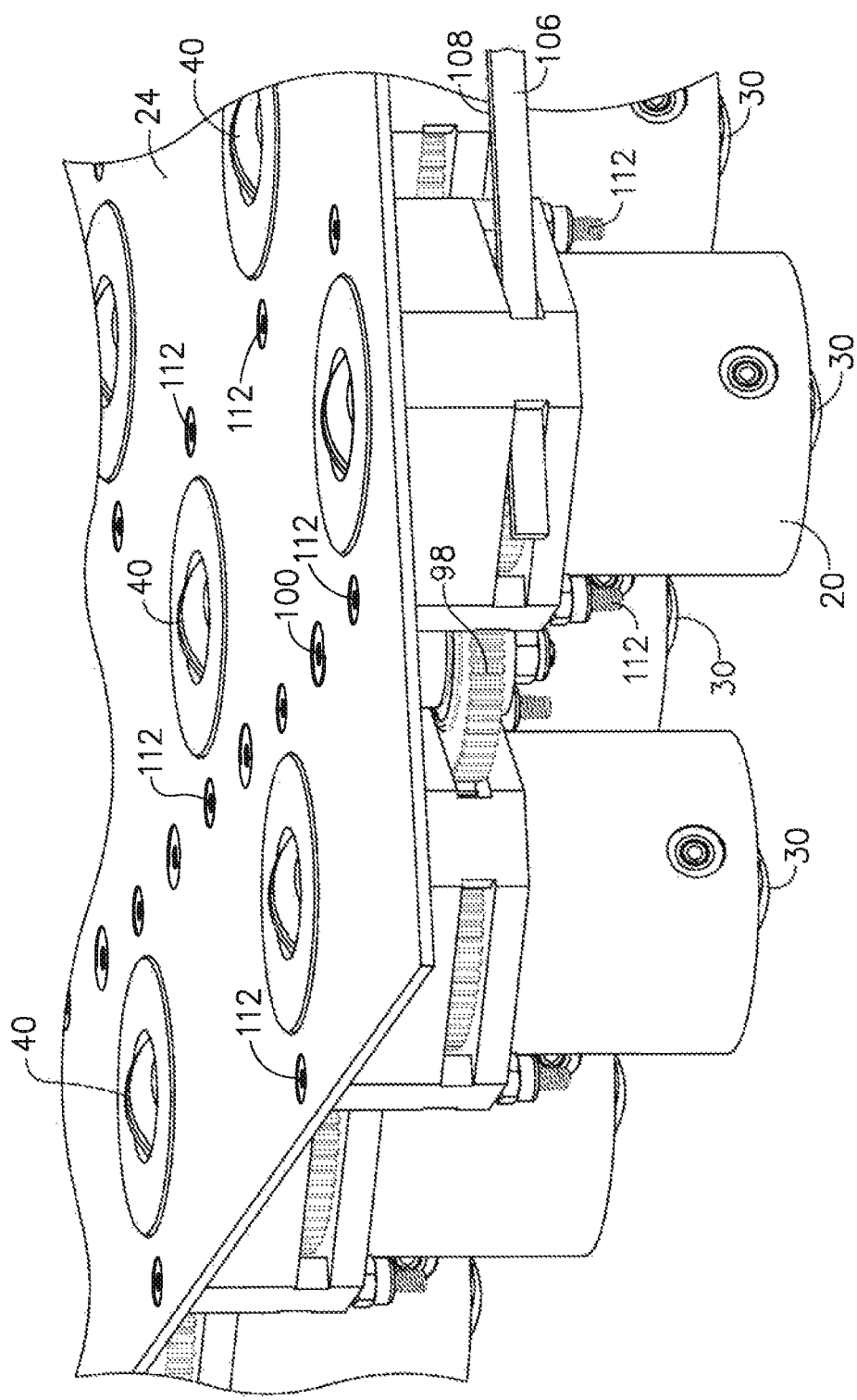
FIG. 7 is an enlarged fragmentary perspective view of the conveyor section of FIG. 5 from the same angle of view as FIG. 6.
Figure 8:
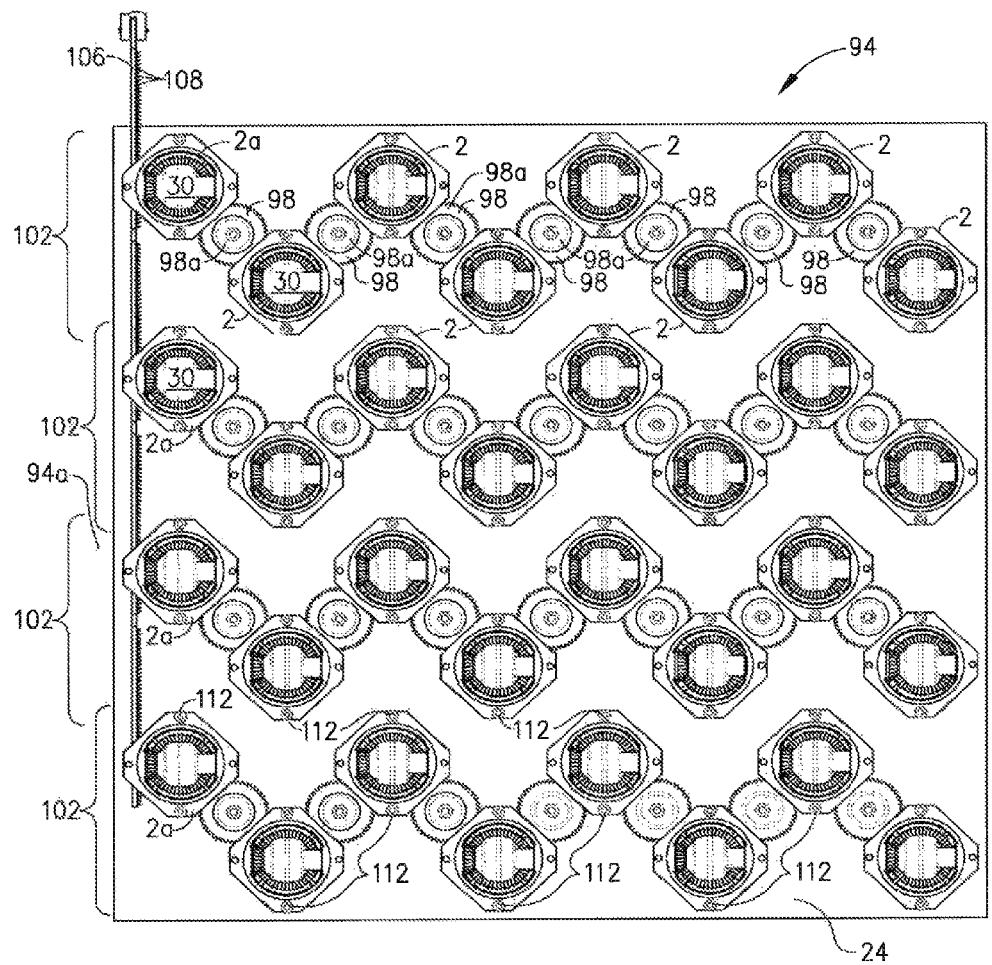
FIG. 8 is a bottom view of the conveyor section of FIG. 5 with the drive conveyor omitted for clarity.
Figure 9:
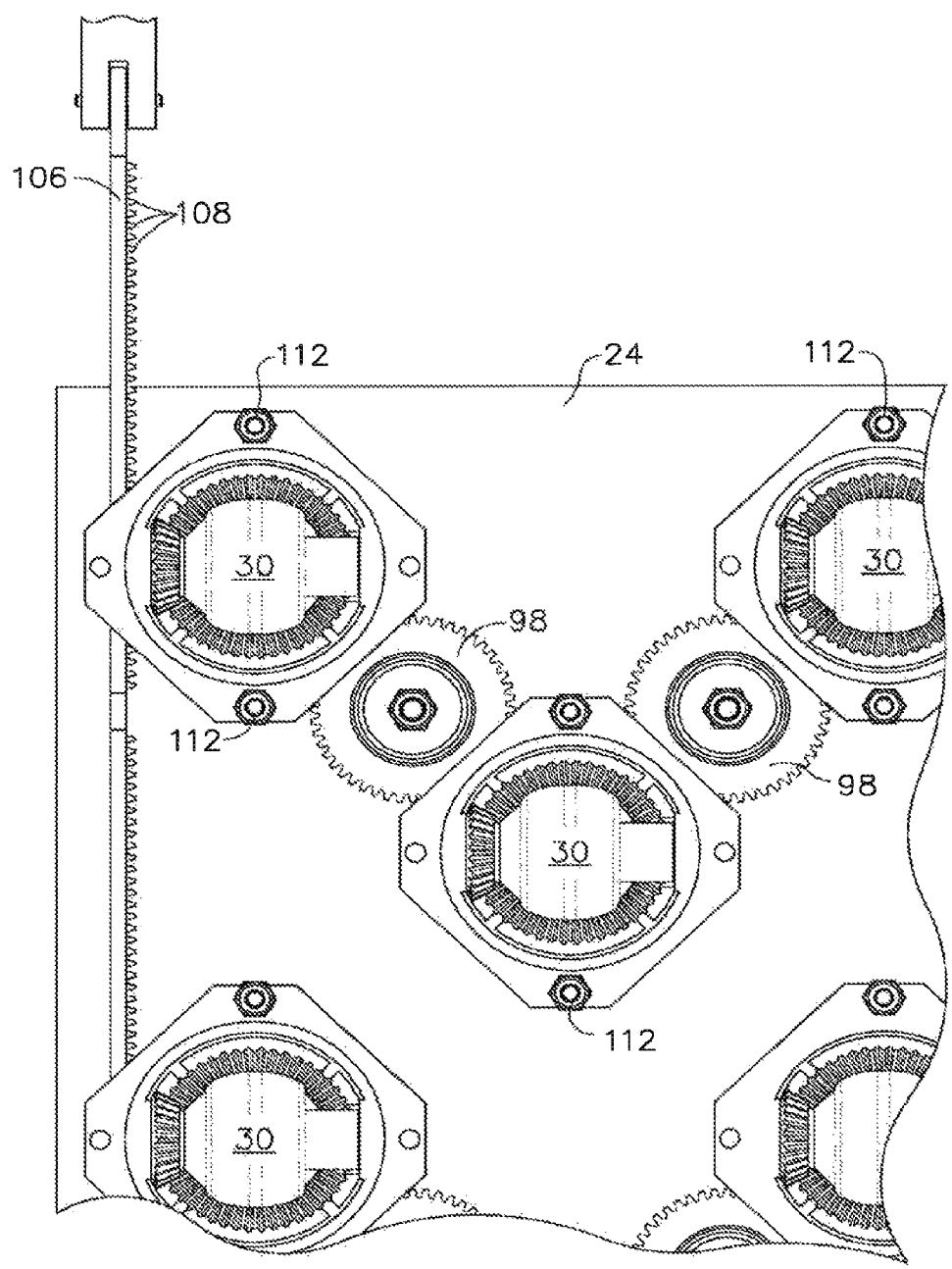
FIG. 9 is an enlarged fragmentary bottom view of the conveyor section of FIG. 5 with the drive conveyor omitted for clarity.

Reference will now be made in detail to one or more embodiments of the innovation illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. Referring in more detail to the drawings, an embodiment of the innovation will now be described.

Figure 16:
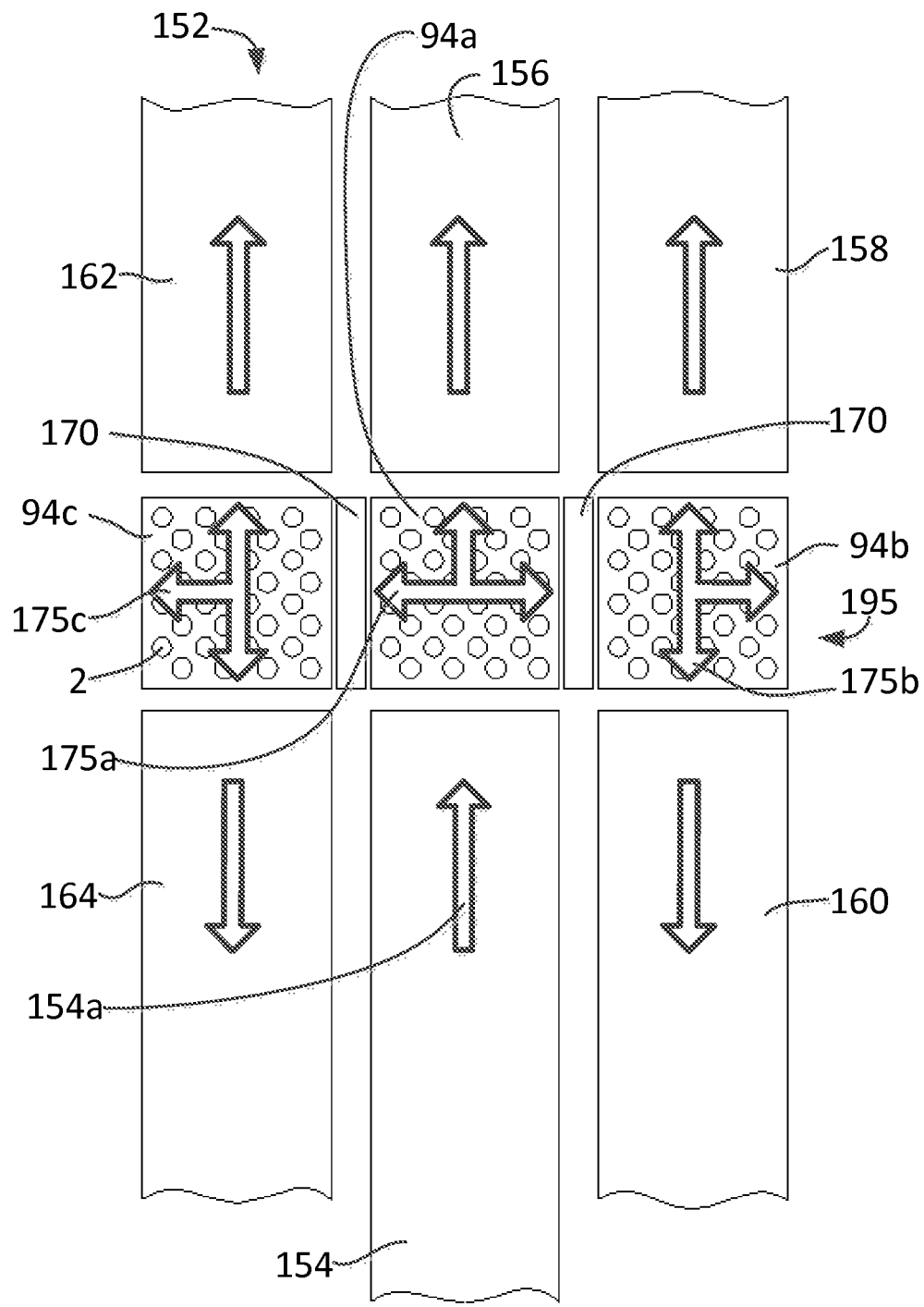
FIG. 16 is an alternate plan view of the pick and pass system of FIG. 15 of a showing how the plurality of variable output orientation transmissions in the plurality of conveyor sections can rotate between plus and minus ninety degrees from a first direction and constructed in accordance with the teachings of the present innovation.
Figure 17:
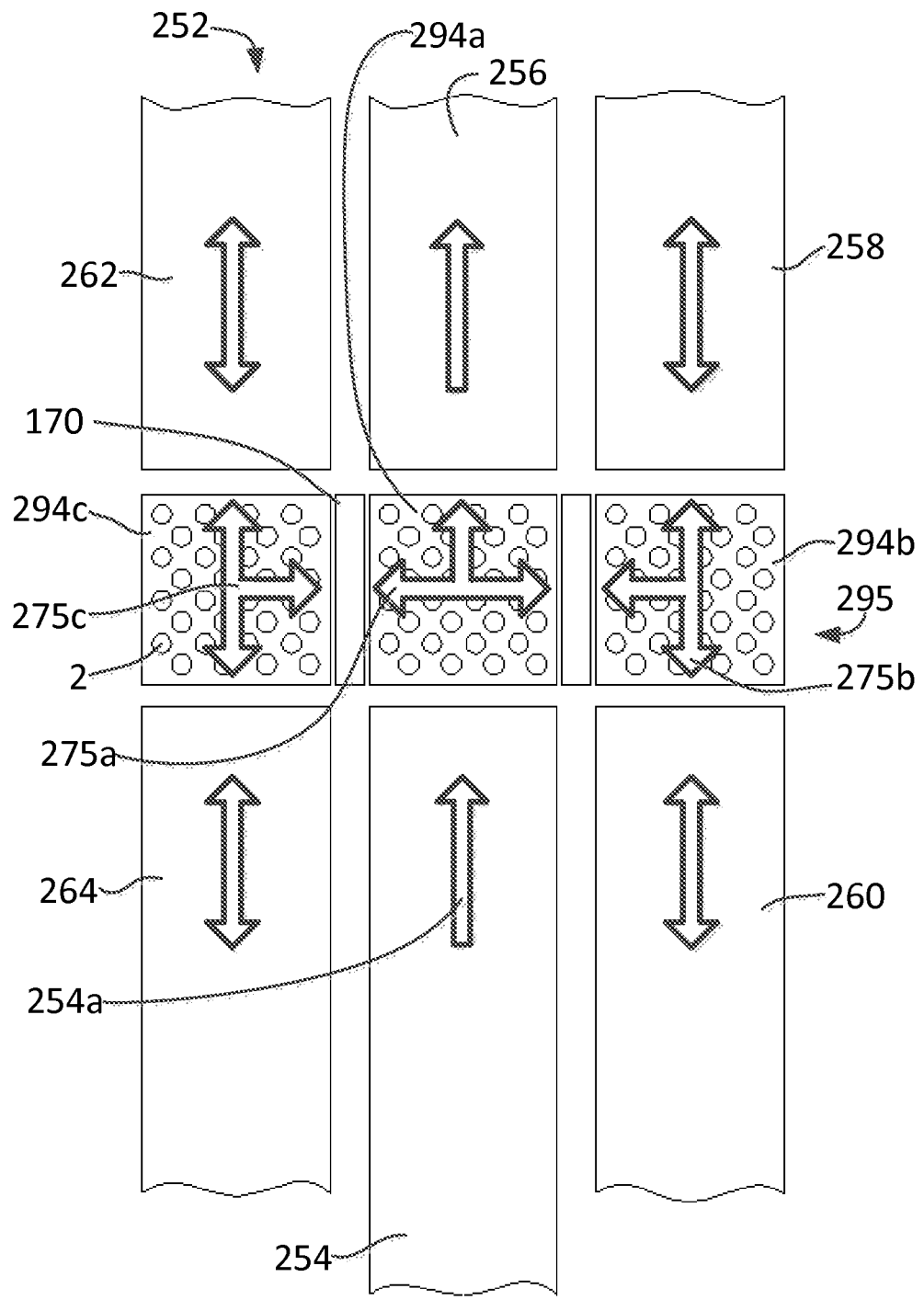
FIG. 17 is a diagrammatic plan view of an alternate pick and pass system of a material handling system comprising a plurality of variable output orientation transmissions in the plurality of conveyor sections can rotate between plus and minus ninety degrees from a first direction and constructed in accordance with the teachings of the present innovation
Figure 18:
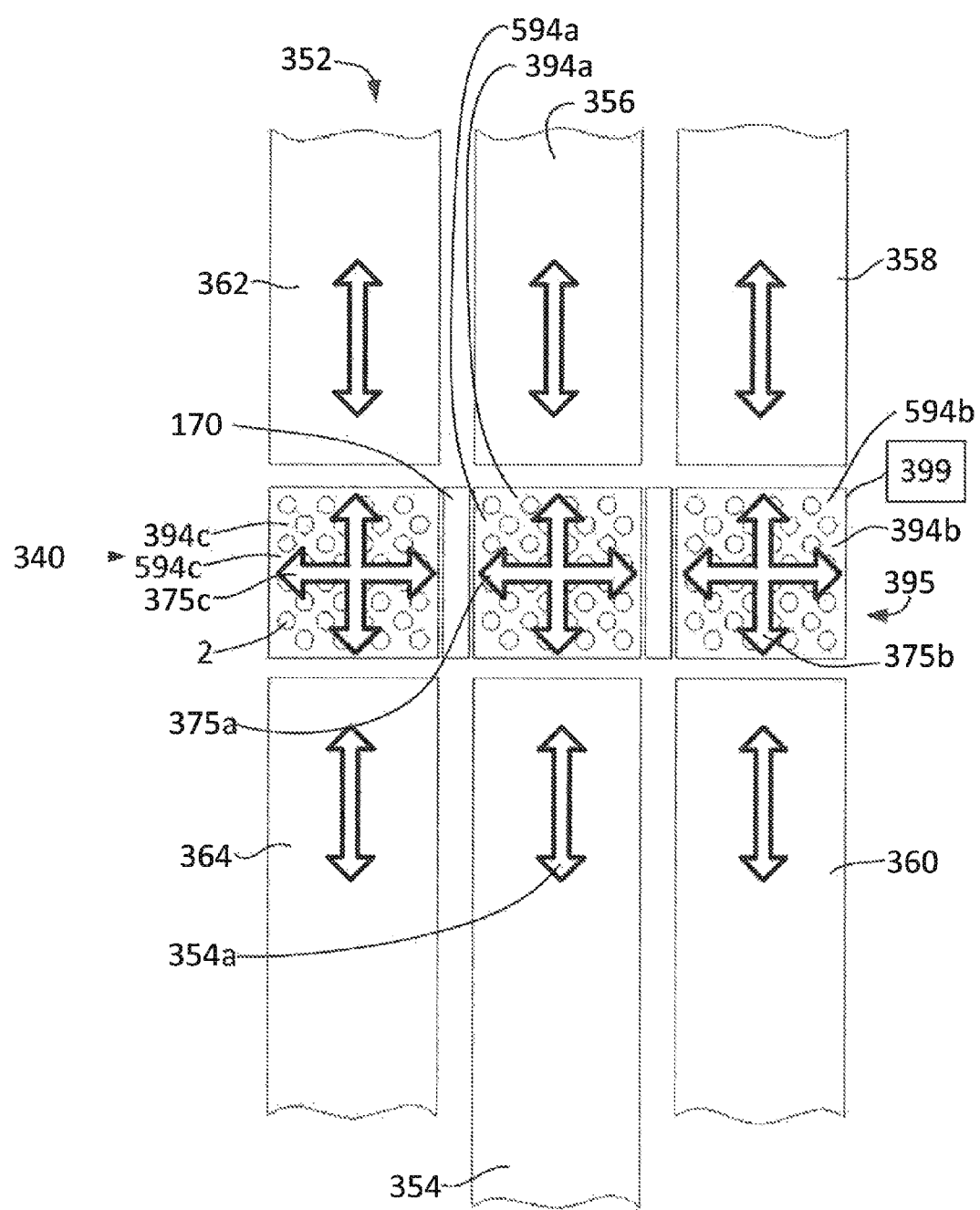
FIG. 18 is a diagrammatic plan view of an alternate pick and pass system of a material handling system comprising a plurality of variable output orientation transmissions in a plurality of conveyor sections with each of the plurality of variable output orientation transmissions configured to drive articles in any direction up to about 360 degrees from a first direction and constructed in accordance with the teachings of the present innovation.

FIGS. 16-18 illustrate exemplary embodiments of a drive 2a and a drive 2b. Drives 2a, 2b are described below, as well as their usage in pick and pass conveyor systems.

Referring to FIGS. 1-4, transmission 2 (also referred to as drive 2) includes first housing 4 and second housing 6 which are rotatable with respect to each other. In the embodiment depicted, housing 4 is generally used in a fixed orientation while housing 6 is rotatably carried by element 10 and raised boss 12 surrounded by annular land 14. Housing 4 has generally cylindrical inner wall 16 extending from end 18 which has an axial length and diameter complementary to the length and diameter of cylindrical outer periphery 8 so as to rotatably receive housing 6. Spaced from end 18 is land 20 which supports and locates end 22 of housing 6. The axial distance between end 18 and land 20 is selected relative to the axial dimension between annular land 14 and end 22 so as to avoid binding and friction between housing 6 and support 24 to which transmission 2 is mounted in FIG. 3, thereby permitting relatively free rotation of housing 6 within housing 4 about axis of rotation 4a.

Housing 4 includes opening or window 26 which provides access to orientation drive 10 as will be described below.

Housing 4 and housing 6 carry drive train 28. Drive train 28 is configured to engage as an input linear motion oriented in a first direction lying in a first plane and output linear motion in any direction lying in a second plane which is not necessarily parallel to the first plane. In the embodiment depicted, drive train 28 comprises input drive 30 driving first pinion 32, first bevel 34 driven by first pinion 32, second bevel 36 driven by first bevel 34, second pinion 38 driven by second bevel 36, and output drive 40 driven by second pinion 38. Drive train 28 may include a torque limiter, interposed between any components of drive train 28, which could protect components of drive train 28 in the event output drive 40 is kept from rotating, for example, due to external conditions acting upon output drive 40.

In the embodiment of drive train 28 depicted, input drives 30 is non-rotatably connected to first pinion 32. This is accomplished in the embodiment depicted by first pinion 32 being of unitary construction with first shaft 42, and input drive 30 non-rotatably carried by first shaft 42. Input drive 30 may be connected to first shaft 42 in any suitable manner, such as by press fit, splines, chemical bonding or welding. First pinion 32 and first shaft 42 do not have to be of unitary construction, and could be formed as separate components. Alternatively, input drive 30 could be of unitary construction with first pinion 32. Input drive 30 may be made of any suitable material, such as polyurethane. First pinion 32 may be made of any suitable material, such as such as Delrin® acetal resin or nylon. First shaft 42 may be made of any suitable material, such as glass filled nylon. It is noted that constructing first shaft 42 of a different material from first pinion 32 precludes unitary construction thereof.

Axle 44 defines the axis of rotation of first shaft 42/first pinion 32, being disposed through the hollow interior of first shaft 42/first pinion 32, and supported at each end by one of a pair of spaced apart bearings 46, 48. Bearings 46, 48 are disposed in respective spaced apart aligned bearing bores 50, 52 of housing 4, with shoulders 54, 56 retaining bearings 46, 48. To assemble the embodiment depicted, bearings 46, 48 may be disposed in bores 50, 52, first shaft 42/first pinion 32 aligned with bearings 46, 48, and axle 44 inserted through the center openings of bearings 46, 48 from either side. In the embodiment depicted, axle 44 engages the hollow interior of first shaft 42/first pinion 32 and the inner races of bearings 46, 48 so as not to allow relative motion therebetween. Axle 44 may be of any suitable configuration, such as a shouldered bolt and nut combination, which, combined with molding shoulders 54, 56 to be disposed on the inside of bearings 46, 48, permits assembly thereof from the outside of housing 4.

In the embodiment of drive train 28 depicted, output drive 40 is non-rotatably connected to second pinion 38. This is accomplished in the embodiment depicted by second pinion 38 being of unitary construction with second shaft 58, and output drive 40 non-rotatably carried by second shaft 58. Output drive 40 may be connected to second shaft 58 in any suitable manner, such as by press fit, splines, chemical bonding or welding. Second pinion 38 and second shaft 58 do not have to be of unitary construction, and could be formed as separate components. Alternatively, output drive 40 could be of unitary construction with second pinion 38. Output drive 40 may be made of any suitable material, such as polyurethane. Second pinion 38 may be made of any suitable material, such as such as Delrin® acetal resin or nylon. Second shaft 58 may be made of any suitable material, such as glass filled nylon. It is noted that constructing second shaft 58 of a different material from second pinion 38 precludes unitary construction thereof.

Axle 60 defines the axis of rotation of second shaft 58/second pinion 38, being disposed through the hollow interior of second shaft 58/second pinion 38, and supported at each end by one of a pair of spaced apart bearings 62, 64. Bearings 62, 64 are disposed in respective spaced apart aligned bearing bores 66, 68 of housing 6, with shoulders 70, 72 retaining bearings 62, 64. To assemble the embodiment depicted, bearings 62, 64 may be disposed in bores 66, 68, second shaft 58/second pinion 38 aligned with bearings 62, 64, and axle 60 inserted through the center openings of bearings 62, 64 from either side. In the embodiment depicted, axle 60 engages the hollow interior of second shaft 58/second pinion 38 and the inner races of bearings 62, 64 so as not to allow relative motion therebetween. Axle 60 may be of any suitable configuration In the embodiment depicted, bevel 34 includes coupling 74 extending axially and aligned with the axis of rotation of bevel 34. Bevel 36 includes coupling 76 which is shaped complementarily to coupling 74 and mates therewith. In embodiment depicted, bevel 34 is identical to bevel 36, with coupling 74 being identical to coupling 76 and bevel 34. Such identity is not required.

Couplings 74 and 76 are each cylindrical in shape, and include respective 180° extensions 74*a*, 76*a* configured to mate non-rotatably with each other as shown. Fastener 78 holds bevels 34 and 36 together, extending through a hole formed in both couplings 74, 76, generally aligned with the axis of rotation of bevels 34, 36.

Bevels 34, 36 are rotatably supported by housing 4. Housing 4 includes centrally aligned bearing support 80 supported by a plurality of arms 82 extending between bearing support 80 and housing 4. Bearing support 80 includes bearing bore 84 with lip 86. Outer race 88*a* of bearing 88 is received by bearing bore 84, and retained therein by retaining ring 90. Inner race 88*a* engages couplings 74, 76, rotatably supporting bevels 34, 36. To assemble the embodiment depicted, bearing 88 is disposed in bearing support 80, and retaining ring 90 installed. Couplings 74, 76 are inserted into inner race 88*a* from opposite sides and fastener 78 installed. Nut 92 is disposed in a complementarily shaped recess, which is sized and shaped to non-rotatably receive nut 92. Fastener 78 may be tightened via driving head 78*a* with an appropriate tool. First pinion 32/first shaft 42/input drive 30 may be thereafter installed in housing 4, and housing 6 disposed in housing 4. Assembly of the components carried by housing 4 may be done in any suitable order and manner.

Once the assembly of components carried by housing 4 and assembly of the components carried by housing 6 are complete, housing 6 may be disposed in housing 4 such that second pinion 38 mates with bevel 36. Once housing 4 is secured to support 24 through a plurality of fasteners, housing 6 is retained axially.

The embodiment depicted illustrates a 1:1 overall drive ratio: Since the first drive ratio (first pinion 32 to bevel 34) is the inverse of the second drive ratio (bevel 36 to second pinion 38). By varying the first and second drive ratios, the overall drive ratio may be varied, producing a speed reduction or multiplier. In the embodiment depicted, each pinion/bevel set is depicted as a gear set, providing positive drive. However, the pinions and bevels do not have to have gear teeth. Any other suitable drive configuration between each pinion/bevel may be used as long as power is transmitted therebetween. For example, the drives could transmit power through frictional engagement, such as friction wheels. It is desirable that the drives be as efficient as possible, such as that provided by the positive drive of intermeshing teeth interface between the pinions and the bevels.

As depicted, input drive 30 and output drive 40 are respectively disposed partially within complementarily shaped central recesses 34*a*, 36*a* of bevels 34, 36 each configured to receive a portion of input drive 30 and output drive 40 respectively, minimizing the overall height of drive 2. In the embodiment depicted, input drive 30 and output drive 40 are illustrated as an input roller and an output roller which are rotatable about an axis and having outer peripheral drive surfaces 30*a*, 40*a* which are configured as being generally flat in the direction perpendicular to the axis of rotation 4*a*, having a width suitable for the particular use of drive 2. For example, while a wider drive surface may be suitable to transmit higher forces without slippage, a narrow drive surface permits rotation relative to a planar surface that engages it, such as the bottom of an article being conveyed, without skewing. Input drive 30 and output drive 40 can have any suitable outer peripheral drive surface configuration for the power being inputted or outputted, such as the circumferential drive surfaces depicted. Although outer circumferential drive surfaces 30*a*, 40*a* are depicted as having a constant radius, peripheral drive surfaces with non-constant or non-uniform radii might be used, such as configured to engage a source of input power complementarily configured to deliver input power to such a peripheral drive surface, or configured to output power with such a non-constant or non-uniform radii. As used herein, linear and planar includes input and output power through such peripheral drive surfaces. The arcuate shape of input drive 30 and output drive 40 depicted allows a more vertically (in the embodiment depicted in the direction axis of rotation 4*a*) compact drive 2 while allowing input drive 30 and output drive 40 to extend farther from their axes of rotation about pins 44, 60, respectively. Axis of rotation 4*a* is intersects the high point of output drive 40, the nominal contact point between output drive 40 and an article supported by output drive. This configuration avoids changing article orientation when the output orientation of output drive 40 is varied, such as by rotation of housing 6 relative to housing 4, while output drive 40 is in contact with an article, because the point of contact between the article and output drive 40 is aligned with the axis of rotation of the output drive 40.

As mentioned, the output orientation of transmission 2 may be varied by rotating housing 6 relative to housing 4. Referring to FIGS. 5-9, there is shown conveyor section 94 comprising a plurality of spaced apart transmissions 2 disposed to selectively convey articles entering conveyor section 94 traveling in the longitudinal direction of arrow 96 from an upstream (not shown). Conveyor section 94, which may also referred to as a conveyor or a conveyor module, may be of any length and shape suitable for the purpose of conveyor section 94. Transmissions 2 are disposed in a pattern sufficiently close enough to ensure that articles are carried by output drives 40 of transmissions 2, not dragging on support 24. The variable orientations of output drives 40 are synchronized to function together as a single conveying surface lying in a first plane, comprised of discrete drives that can be synchronously oriented to convey articles in any desired path.

Transmissions 2 are interconnected through respective idlers 98 interposed to engage orientation drive elements 10 of adjacent transmissions 2 such that the orientations of output drives 40 are aligned. Idler 98 are rotatably carried by support 24, mounted on respective bearings 98a and secured to support 24 by respective fasteners 100. In the embodiment depicted, transmissions 2 are interconnected into rows 102, such that controlled rotation of one controlled transmission 2a of a row 102 results in rotation of all transmissions 2 of that row 102. In the depicted embodiment, transmissions 2a are those along longitudinal side 95 of conveyor section 94. Any suitable number of rows 102 may be used, with any suitable number of transmissions 2 in each row 102.

Rotation of each controlled transmission 2a is synchronized, which may be accomplished by each controlled transmission 2a having a respective individual actuator. In the depicted embodiment, single actuator 104 controls rotation of all controlled transmission 2a in conveyor section 94. Actuator 104, which may be pneumatic, hydraulic or electrically operated to reciprocate element 106, which in the embodiment depicted is disposed through windows 26 of controlled transmissions 2a to be retained adjacent orientation drive elements 10. Element 106 is configured as a rack of a plurality of teeth 108 which engage complementary shaped teeth of respective orientation drive elements 10 of controlled transmissions 2a.

Element 106 may have teeth 108 along its entire length, with actuator 104 configured to move element 106 so as to achieve a full 360° rotation of output drives 40. It is noted that only 180° of rotation may be required when coupled with the ability to move endless drive belt 110 bi-directionally. An endless belt may be of unitary construction, or have ends joined together such as by a permanent splice or a detachable splice (such as mechanical splice).

Endless drive belt 110 lies in a second plane below the first plane defined by output drives 40. Endless drive belt 110 is disposed adjacent the plurality of input drives 30 in driving relation thereto. Input drives 30 are configured to engage endless drive belt 110 with their circumferential drive surfaces 30a. Input drives 30 are rotationally aligned with the direction of motion of belt, in the longitudinal direction, fixed by the mounting of transmissions 2 to support 24 through fasteners 112. Linear movement of endless drive belt 110 functions as a source of linear power or motion and causes input drives 30 to rotate, resulting in rotation of output drives 40, thereby outputting linear motion in the first plane. Input drives 30 may receive linear power from any suitable source, such as by circumferential drive surfaces 30a engaging the circumferences of a rotating shaft such as a driven roller or a Motorized Drive Roller.

In the embodiment depicted, with actuator 104 in the position shown, advancing endless drive belt 110 in the direction of arrow 96 causes output drives 40 to rotate so as advance articles carried thereon to advance in the direction of arrow 96. Regardless of the input direction provided by endless drive belt 110, the output direction may be in any direction, ranging from the same direction to the opposite direction. Actuation of actuator 104 so as to rotate housings 6 180° would result in articles carried by output drive 40 to advance in the direction opposite arrow 96. As will be appreciated, actuator 104 may be actuated to rotate output drives 40 clockwise or counter clockwise at any angle between −180° (counterclockwise from the top) and +180° (clockwise from the top) providing controllable variable output orientation for transmissions 2. This allows conveyor section 94 to direct articles in 360° of direction. If endless drive belt 110 is configured to be driven bi-directionally, actuator 104 need only be configured to rotate output drives 40 clockwise or counter clockwise at any angle between −90° (counterclockwise from the top) and +90° (clockwise from the top) to achieve the ability to direct articles in 360° of direction. If no more than a 90° divert is desired, with a bi-directional source of power, conveyor section 94 need only to be configured to rotate output drives 40 clockwise or counter clockwise between 0° and 90° in one direction (whether clockwise or counterclockwise).

When output drives 40 transmit power, such as when conveying articles, the reaction force between input drives 30 and their source of power, in the embodiment depicted endless drive belt 110, increases as power is required to convey articles. Since the present innovation allows input drives 30 to remain aligned with their source of power, the reaction force remains aligned with that source of power regardless of the orientation of output drives 40. Thus, input drives 30 of the present innovation do not produce a skewing or mistracking force on the endless drive belt 110, and there is no scuffing due to a difference in the force vectors.

Figure 10:
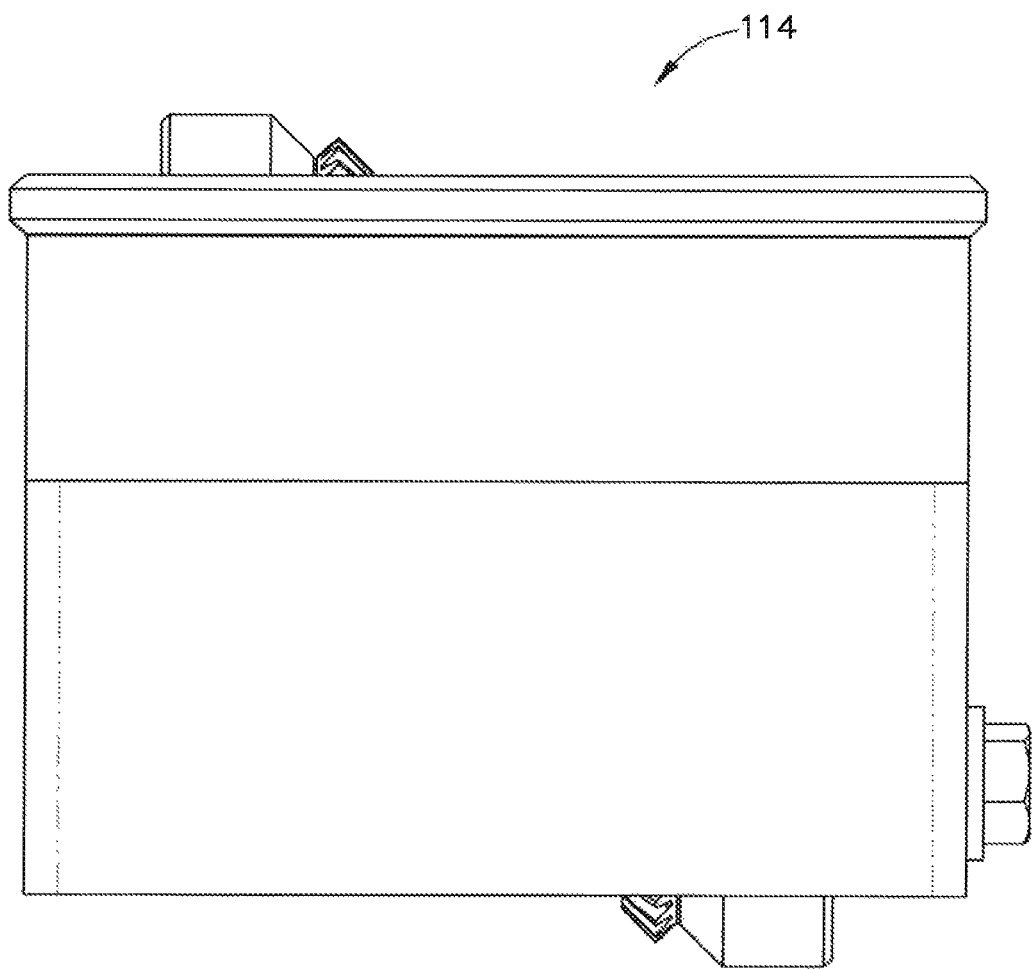
FIG. 10 is a side view of another embodiment of a variable output orientation transmission constructed in accordance with the teachings of the present inn.
Figure 11:
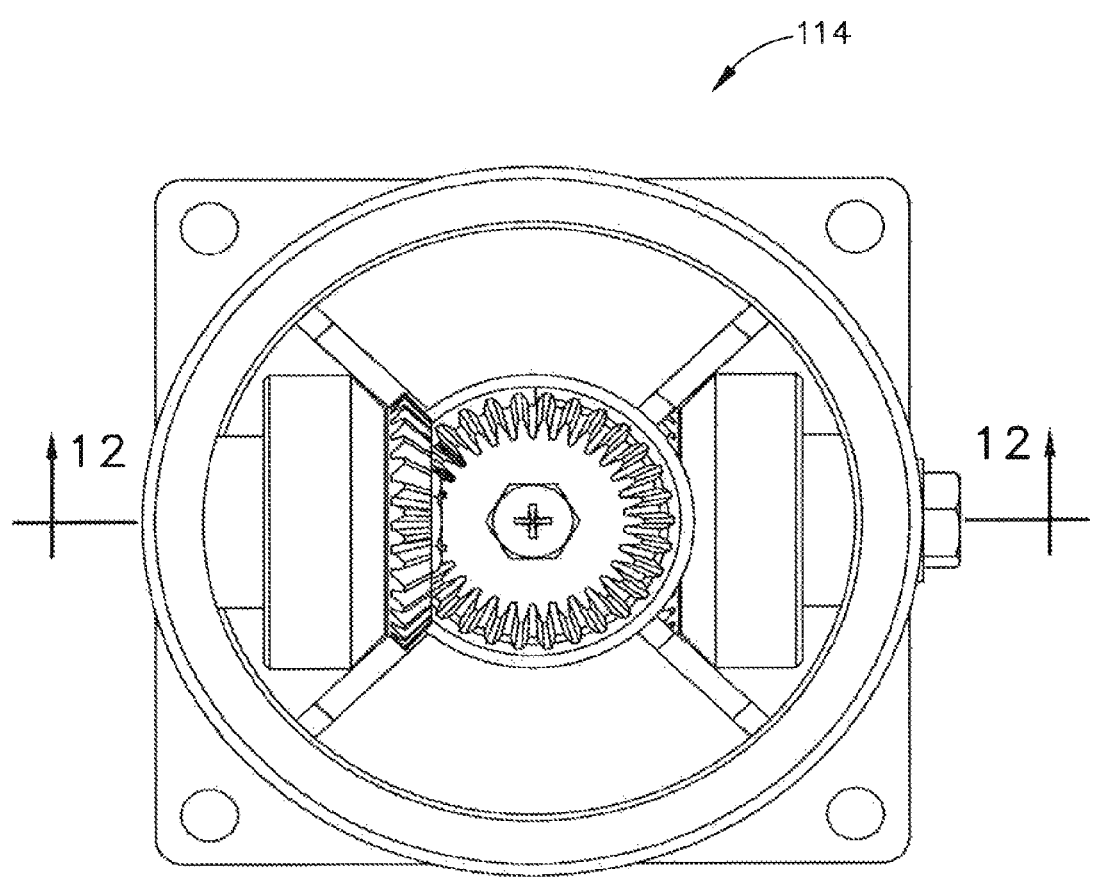
FIG. 11 is a top view of the transmission of FIG. 10.
Figure 12:
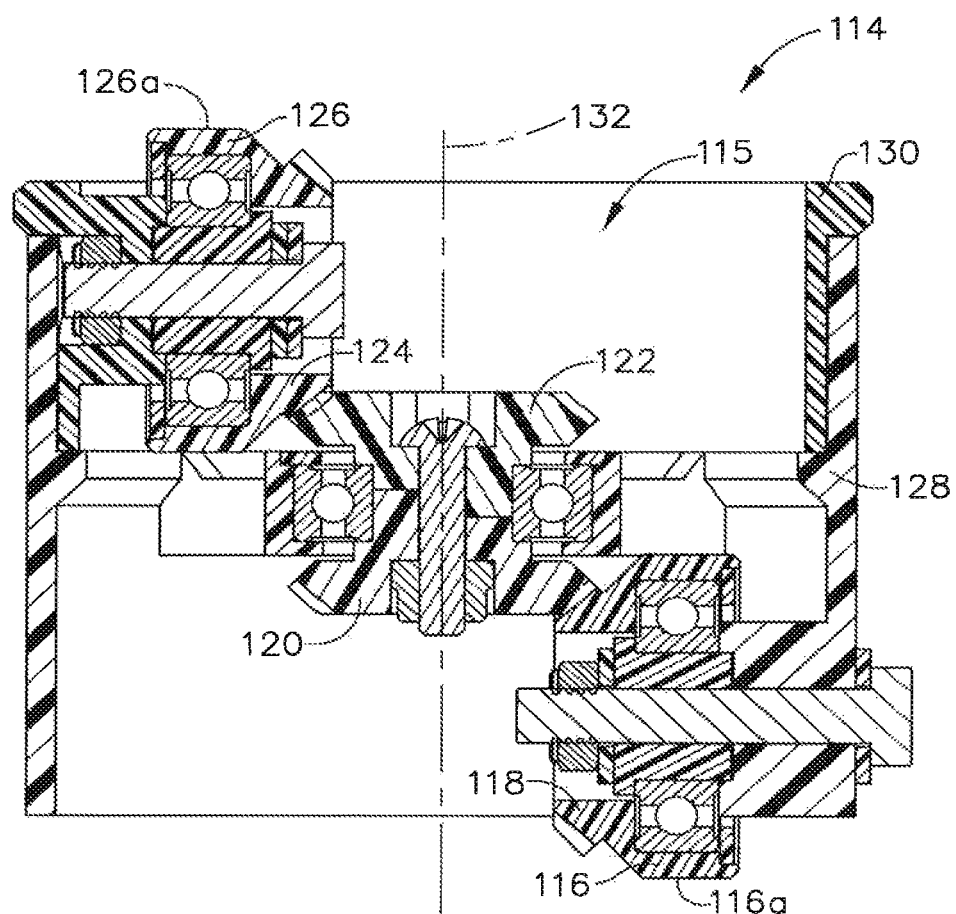
FIG. 12 is cross-sectional side view of the transmission of FIG. 10 taken along line 12-12 of FIG. 11.

Referring to FIGS. 10-12, another embodiment of a drive train 115 of a variable output orientation transmission 114 is illustrated. Input drive 116 is non-rotatably connected to first pinion 118, first bevel 120 driven by first pinion 118, second bevel 122 non-rotatably connected to and driven by first bevel 120, second pinion 124 driven by second bevel 122, and output drive 126 non-rotatably connected to and driven by second pinion 124.

Input drive 116 and output drive 126 are configured as having cylindrical outer peripheral drive surfaces 116a, 126a. Housing 128 carries input drive 116, first pinion 118, first bevel 120 and second bevel 122. Housing 130 is rotatably received and carried by housing 128, and carries second pinion 124 and output drive 126. Rotation of housing 130 relative to housing 128, which may be accomplished in any suitable manner, varies the output orientation of output drive 126. It is noted that in the configuration of drive train 115, output drive 126 is offset, not aligned with vertical axis of rotation 132. The article orientation may change when housing 130 is rotated because the point of contact between the article and output drive 126 is not aligned with the axis of rotation of output drive 126. It is also noted that the mounting of transmission 114 to a conveyor support (not shown) and orientation drive element (not shown) may be configured as discussed above with respect to housing 4 and housing 6.

Figure 13:
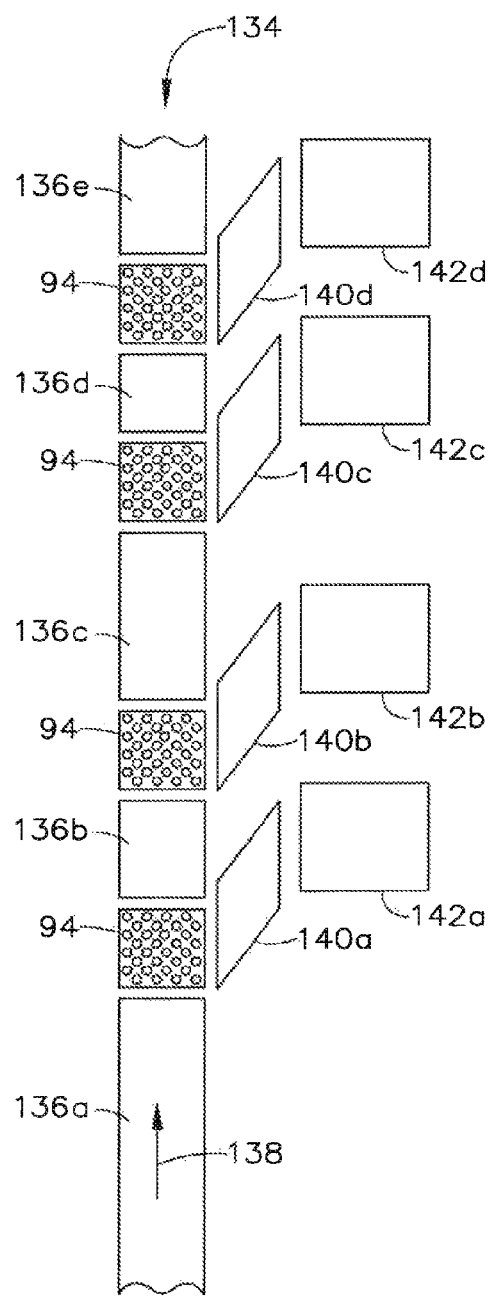
FIG. 13 is a diagrammatic plan view of a sortation conveyor system of a material handling system comprising a plurality of conveyor sections which comprise a plurality of variable output orientation transmission constructed in accordance with the teachings of the present innovation.

FIGS. 13-18 diagrammatically illustrate examples of systems embodying one of more conveyors constructed in accordance with the teachings of the present innovation. FIG. 13 illustrates sortation system 134 having a plurality of conveyor sections 136a-136e and one or more conveyor sections 94 interposed between respective conveyor sections 136a-136e, with each conveyor section 94 being a divert location at which articles moving on conveyor system 134 in the direction of travel arrow 138 may selectively be diverted to a respective associated after sort conveyor 140a-140d which feeds a respective associated downstream conveyor 142a-142d. Although after sort conveyors 140a-140d are diagrammatically illustrated as straight conveyors, they may be curved. Respective drives 2 of any conveyor section 94 may be selectively actuated at an appropriate time to divert an article carried by sortation system 134 onto an appropriate after sort conveyor 140 while maintaining the orientation of the article relative to the direction the article is traveling.

Figure 14:
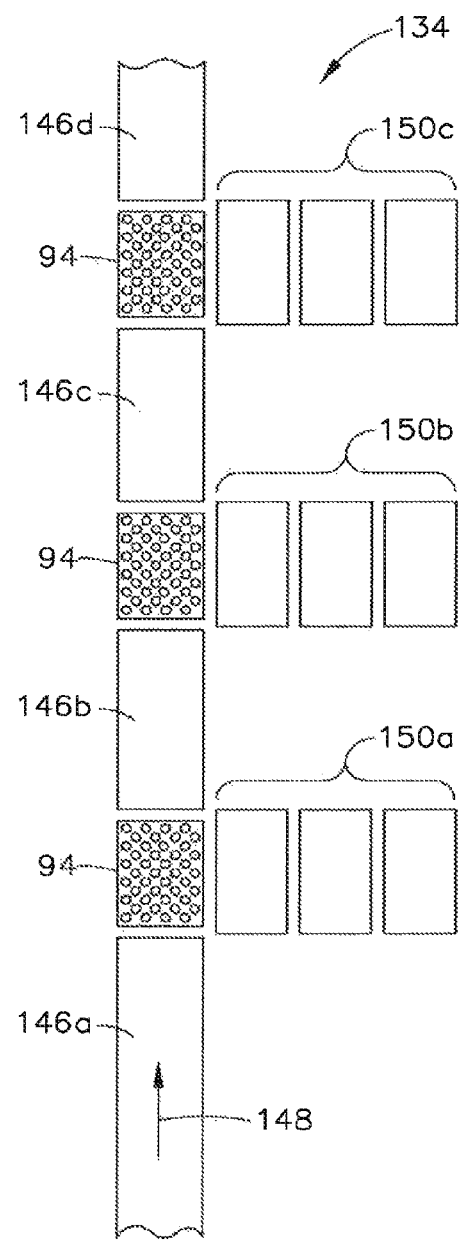
FIG. 14 is a diagrammatic plan view of a right angle sortation conveyor system of a material handling system comprising a plurality of conveyor sections which comprise a plurality of variable output orientation transmission constructed in accordance with the teachings of the present innovation.

FIG. 14 diagrammatically illustrates right angle sortation system 144 having a plurality of conveyor sections 146a-146d and one or more conveyor sections 94 interposed between respective conveyor sections 146a-146d, with each conveyor section 94 being a divert location at which articles moving on conveyor system 144 in the direction of travel arrow 148 may selectively be diverted to a respective associated after sort conveyor 150a-150c disposed at a 90° angle to the direction of travel. Respective drives 2 of any conveyor section 94 may be selectively actuated at an appropriate time to orient drives 2 to divert an article carried by sortation system 144 onto an appropriate after sort conveyor 140 while changing the orientation of the article by 90° relative to the direction the article is traveling.

Figure 15:
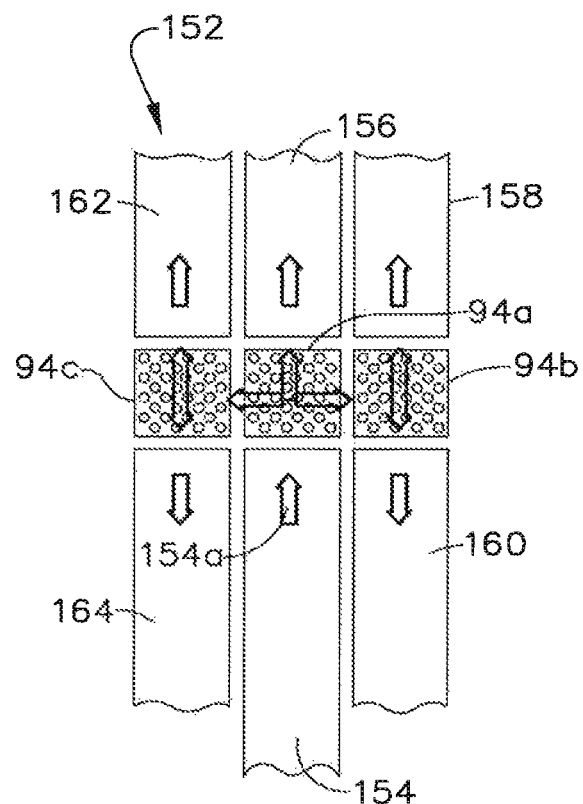
FIG. 15 is a diagrammatic plan view of a pick and pass system of a material handling system comprising a plurality of conveyor sections which comprise a plurality of variable output orientation transmission constructed in accordance with the teachings of the present innovation.

FIG. 15 diagrammatically illustrates pick and pass system 152 having feed conveyor 154 traveling in the direction of travel indicated by arrow 154a. Articles discharged onto conveyor section 94a by feed conveyor 154 may be selectively advanced without diversion onto conveyor 156 by orienting drives 2 of conveying section 94a to so direct articles. By actuating drives 2 of conveying section 94a to orient 90° relative to arrow 154a, articles may be discharged 90° onto conveyor section 94b, with drives 2 of conveying sections 94b being oriented in alignment with drives 2 of conveying section 94a to receive such articles. Drives 2 of conveying section 94b may then be actuated to orient drives 2 90° to discharge such articles onto either conveyer 158 or 160. Similarly, by actuating drives 2 of conveying section 94a to orient in the opposite 90° direction relative to arrow 154a, articles may be discharged 90° onto conveyor section 94c, with drives 2 of conveying sections 94c being oriented in alignment with drives 2 of conveying section 94a to receive such articles. Drives 2 of conveying section 94c may then be actuated to orient drives 2 90° to discharge such articles onto either conveyer 162 or 164.

Pick and pass systems generally pick articles from one conveyor, and pass the article onto another conveyor via an intermediate conveying section.

FIG. 16 is a modified view of the pick and pass system 152 of FIG. 15 with arrow clusters 175a, 175b, and 175c illustrating the +/90 degree rotation or orientation range available to drives 2 mounted to each of conveyor sections 94a, 94b, 94c. Articles on each conveyor section 94a, 94b, or 94c can be selectively advanced along a direction of travel such as any one of three arrows of respective arrow clusters 175a, 175b, and 175c, or along a direction of travel between any two arrows extending at a right angle. As illustrated, the pick and pass system 152 can receive articles from conveyor 154, and can discharge the articles onto any of a plurality of five conveyors 156, 158, 160, 162, and 164. The pick and pass system 152 depicted cannot receive articles from any of conveyors other than conveyor 154, and due to the +/−90 degree range available to drives 2 in conveyor sections 294b and 294c, cannot move articles from conveyor sections 94b and 94c onto conveyor section 94a.

FIG. 17 diagrammatically illustrates an alternate pick and pass system 252 where drives 2 are mounted to conveyor sections 294a, 294b, 294c and move through the +/90 degree direction of travel range as illustrated by arrows of arrow clusters 275a, 275b, and 275c. Articles can be advanced in the directions indicated by the three arrows extending from arrow clusters 275a, 275b, and 275c and in directions of travel between any two arrows that extend at right angles. In this embodiment, each of conveyors 258, 260, 262, and 264 are bidirectional and can move articles in either direction as shown by double headed arrows. Conveyor system 252 may pass articles in one direction between conveyor 254 and conveyor 256, pass articles in both directions between conveyors 258 and 260, and pass articles in both directions between conveyors 262 and 264. Articles received from outside conveyors 258, 260, 262, 264 can be diverted onto conveyor 256 by respective conveyor sections 294a, 294b, 294c. Direction of travel arrows extending from arrow clusters 275a, 275b, and 275 show conveyor sections 294b and 294c can discharge articles onto, but cannot receive articles from conveyor section 294a. For pick and pass system 252, articles received from conveyor 254 can pass to be picked from conveyor sections 294b and passed to conveyor 256.

Figure 19:
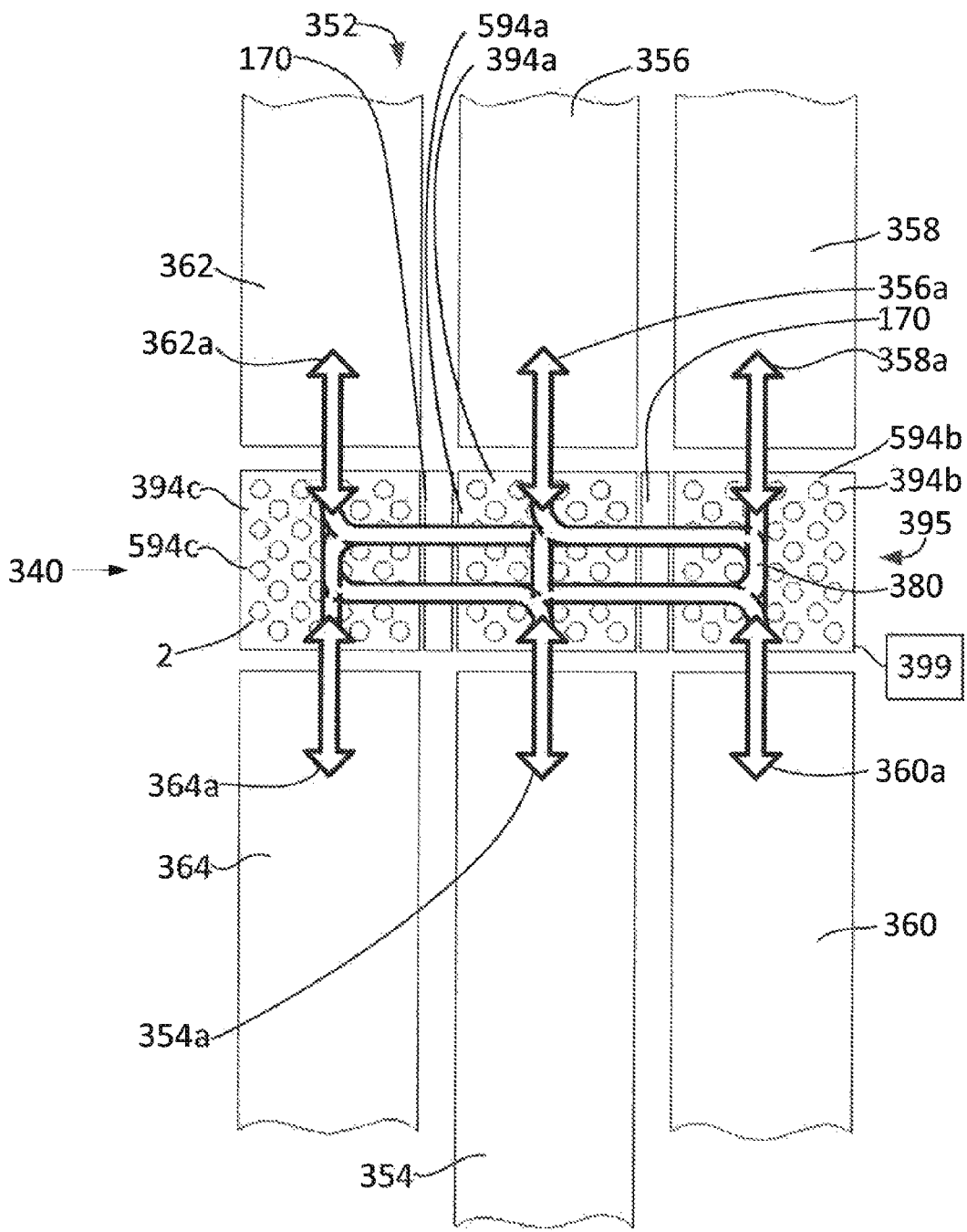
FIG. 19 is an alternate plan view of the pick and pass system of FIG. 18 showing article movement paths that include an orbital path on one or more conveyor sections, and paths indicating how articles can be picked from or discharged onto any one of six conveyors in accordance with the teachings of the present innovation.

FIGS. 18 and 19 diagrammatically illustrate an alternate embodiment of a pick and pass system 352 having drives 2 orientable through +/−180 degrees. Drives 2 in any of drive tables or conveyor sections 394a, 394b, and 394c can synchronously rotate or orient from the first orientation to a second orientation that is any angle up to 360 degrees from the first orientation to redirect articles traveling thereon from the first direction of travel to a second direction of travel. Drives 2 on any of drive tables or conveyor sections 394a, 394b, and 394c can comprise a plurality of output drives 40 that each define a section conveying surface 594a, 594b, and 594c respectively on each of conveyor sections 394a, 394b, and 394c. Section conveying surface 594a, 594b, and 594c are each connected to actuator 104 by linearly moving racks or elements 106 to redirect articles thereon when output drives 40 rotatably move from a first orientation to a second orientation. Directions of travel include along any of the direction of travel arrows of respective arrow clusters 375a, 375b, and 375c, or along any direction of travel between any two directions of travel that extend at right angles. In this embodiment, each of the plurality of six conveyors 354, 356, 358, 360, 360, 362 364, henceforth referred to as conveyors 354-364, can move in opposite directions as indicated by double headed arrows thereon. Conveyor sections 394a, 394b, 394c are interposed between conveyors 354-364 and connect with conveying surfaces thereon. The interposed conveyor sections 394a, 394b, and 394c can comprise a central hub 340 of the pick and pass system 352 for moving articles between any of the plurality of conveyors 354-364. Articles received on the central hub 340 or can be held stationary thereon, or can be discharged onto to any of conveyors 354-364. Alternately, one or more articles can circulate in a loop 380 on one or more of conveyor sections 394a, 394b, 394c. As the one or more articles recirculate in loop 380, additional articles can be inserted to circulate in loop 380 from adjacent conveyor sections 394a, 394b, and 394c or from any of conveyors 354-364. Likewise, articles in loop 380 can be discharged onto any of adjacent conveyor sections 394a, 394b, 394c or from any of conveyors 354-364. Alternately, while the articles circulate in the loop, additional articles can be received from conveyors 354-364 and can be conveyed across the loop between opposing conveyors. If desired the direction of loop 380 can be changed. For example, articles circulating in a clockwise direction around loop 380 can be reversed to orbit or loop in a counterclockwise direction. The path of loop 380 and possible article paths are depicted on conveyor sections 394a, 394b, 394c, but are not limited thereto.

Figure 20:
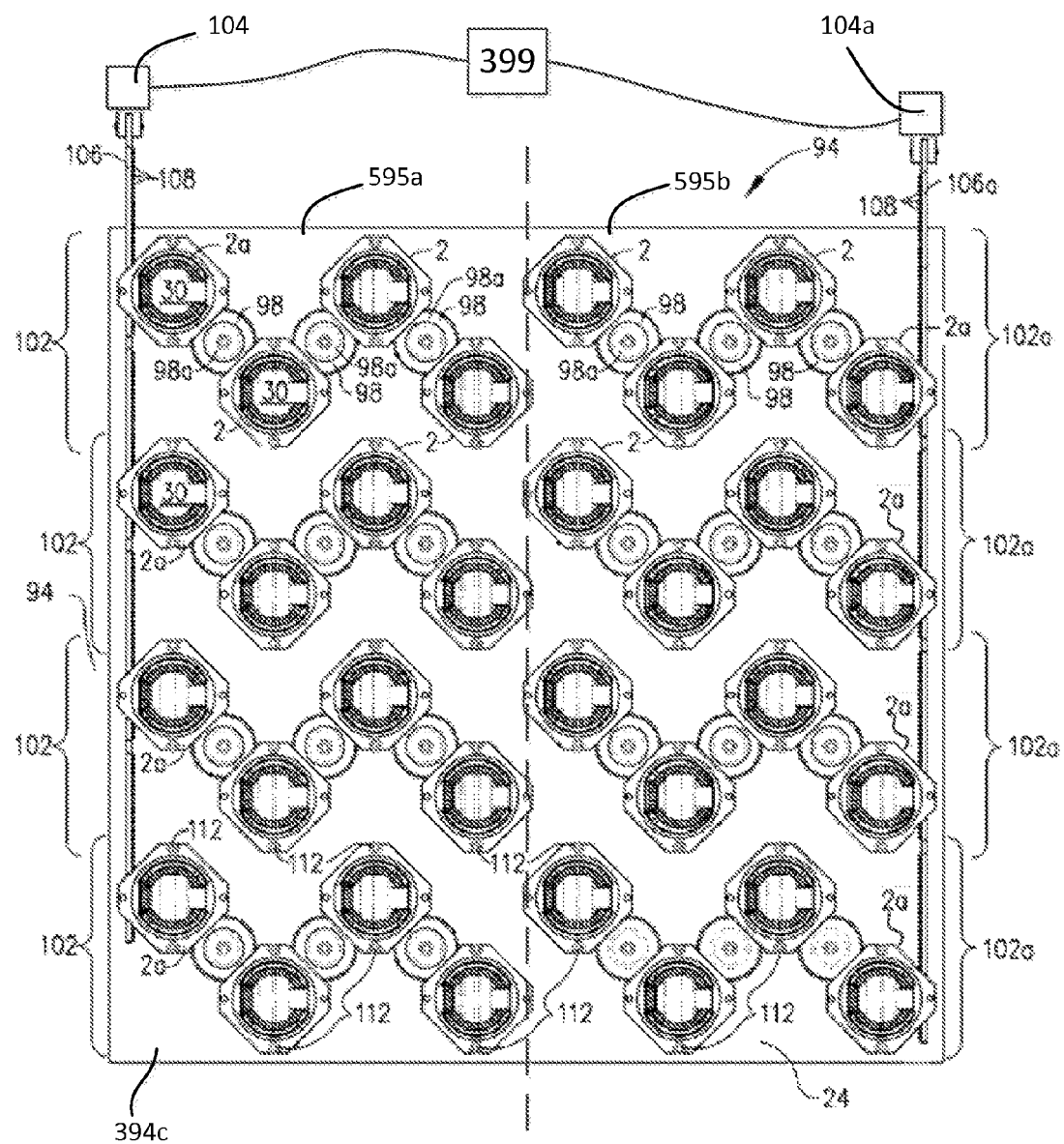
FIG. 20 is an enlarged plan view of a conveying section of FIG. 19 showing multiple actuators controlling multiple section conveying surfaces.

The pick and pass sortation system or pick and pass system 352 can comprise a plurality of conveying surfaces such as section conveying surfaces 594a, 594b, and 594c as previously disclosed on respective conveyor sections 394a, 394b, 394c. Alternately, as shown in FIG. 20, at least one of the s conveying sections, such as for example, conveying section 394c can comprise multiple conveying surfaces shown as conveying surfaces 595a and 595b. Each of conveying surfaces 595a and 595b are operably connected to respective actuators 104 and 104a and each of the actuators are operably coupled to controller 399. Controller 399 can individually control the linear movement of each of the actuators 104 and 104a. For example, actuator 104 can be a linear actuator connected to conveying section 394c and operably connected to rack or element 106 to rotate or orient each of the output drives 40 in interconnected controlled drives 2*a* and drives 2 in response to linear motion. Likewise, actuator 104*a* can be a linear actuator connected to rack or element 106 to rotate or orient each of the output drives 40 in controlled drives 2*a* in response to linear motion. Output drives 40 operably connected to actuator 104 comprise section conveying surface 595*a* and output drives 108 operably connected to actuator 104*a* define section conveying surface 595*b*. Each of section conveying surfaces 595*a* and 595*b* are individually orientable via actuators 104, 104*a* respectively, with each separately directing articles in any direction up to 360 degrees from a first direction. Actuators 104 and 104*a* can move elements 106 and 106*a* respectively in a linear direction from a first position to a second position. Depending on the direction of motion of the element 106, the drive elements 40 can be rotated clockwise or counterclockwise. Depending on the linear distance between the first position and the second position, the actuators 104, 104*a* can rotate the interconnected output drives to any orientation up to 360 degrees from the first orientation.

As shown, controlled drives 2*a* can comprise a line of controlled drives engaging the element 106. A second line of controlled drives 2*a* is shown operably connected to element 106*a*. Controlled drives 2*a* can be interconnected to a plurality of drives 2 by idlers 98 such that actuation of an actuator 104 or 104*a* rotates or orients all of the output drives interconnected therewith. As shown, actuator 104 controls a plurality of interconnected drives 2, 2*a* and can rotate or orient the output drives 40 thereof that define conveying section 595*a*. And, actuator 104*a* controls a separate plurality of interconnected drives 2, 2*a* and can rotate or orient the output drives 40 thereof that define conveying section 595*b*. Whereas FIG. 20 shows two lines of controlled drives 2*a* and two conveying sections 595*a* and 595*b* in conveying section 394*c*, the present innovation is not limited thereto.

Spacers 170 can be placed between adjacent conveying sections such as conveying sections 94*a-c*, 294*a-c*, and 394*a-c*.

The foregoing description has been presented for purposes of illustration and description. It is not intended to be exhaustive or to limit the innovation to the precise form disclosed. Obvious modifications or variations are possible in light of the above teachings. The embodiment was chosen and described in order to illustrate the principles of the innovation and its application to thereby enable one of ordinary skill in the art to utilize the innovation in various embodiments and with various modifications as are suited to the particular use contemplated. Although only a limited number of embodiments of the innovation are explained in detail, it is to be understood that the innovation is not limited in its scope to the details of construction and arrangement of components set forth in the preceding description or illustrated in the drawings. The innovation is capable of other embodiments and of being practiced or carried out in various ways. Also, specific terminology was used herein for the sake of clarity. It is to be understood that each specific term includes all technical equivalents which operate in a similar manner to accomplish a similar purpose. It is intended that the scope of the innovation be defined by the claims submitted herewith.

The invention claimed is:

1. A pick and pass sortation system for selectively conveying articles thereon, the pick and pass sortation system comprising:

a plurality of conveyors, each comprising a respective conveying surface movable in a first direction for discharging articles therefrom and movable in a second direction for receiving articles thereon; and at least one conveying section comprising a central hub interposed between ends of the plurality of conveyors for receiving articles thereon from any of the plurality of conveyors and for discharging conveyed articles thereon onto any of the plurality of conveyors extending therefrom, the at least one conveying section comprising a plurality of powered output drives with each outputting linear motion and each rotatably secured to the at least one conveying section to define a powered section conveying surface for transmitting power and linear motion to conveyed articles thereon, each powered output drive directionally rotatable around a respective axis of rotation perpendicular to the powered section conveying surface, and each powered output drive rotatable around their respective axis of rotation from a first orientation for conveying articles in a first direction in response to the outputted linear motion to a second orientation for conveying articles in a second direction in response to the rotational orientational change in outputted linear motion, wherein the second direction is any direction on the powered section conveying surface up to a full 360 degrees of direction from the first direction.

2. The pick and pass sortation system of claim 1 further comprising an actuator attached to the at least one conveying section and operably coupled to a powered output drive to define a controlled drive, wherein actuation of the actuator rotates the controlled drive engaged therewith from the first orientation to the second orientation.

3. The pick and pass sortation system of claim 2 further comprising an actuator operably interconnected to a plurality of controlled drives in a line, wherein actuation of the actuator synchronously rotates all of the controlled drives in the line from a first orientation to a second orientation.

4. The pick and pass sortation system of claim 2 further comprising a plurality of idlers interposed between adjacent drives to operatively interconnect the plurality of adjacent drives together, wherein one of the interconnected drives is the controlled drive and actuation of the actuator synchronously rotates all of the interconnected drives.

5. The pick and pass sortation system of claim 4 further comprising a plurality of actuators attached to the at least one conveying section with each of the plurality of actuators operably coupled to at least one row of drivers, wherein each of the plurality of actuators can be operated independently and articles conveyed on different rows can be conveyed in different directions.

6. The pick and pass sortation system of claim 5 wherein the actuator moves linearly in response to actuation and the controlled drives are configured to convert the linear movement into rotation, wherein actuation of the actuator moves the rotates all of the drives interconnected thereto.

7. The pick and pass sortation system of claim 6 wherein linear movement of the actuator in a first direction orients all interconnected drives in a first direction, and linear movement of the actuator in a second direction orients all interconnected drives in a second direction that is different from the first direction.

8. The pick and pass sortation system of claim 7 wherein linear movement of the actuator a first amount moves the controlled drives to the first orientation, and linear movement of the actuator a second amount moves the controlled drives to the second orientation.

9. The pick and pass sortation system of claim 7 further comprising a rack attached to the actuator that engages teeth on an orientation drive element of the controlled drive, wherein linear movement of the rack is converted to rotary motion at the control drive to orient at least the control drive to the first direction.

10. The pick and pass sortation system of claim 6 wherein the actuator is pneumatic.

11. The pick and pass sortation system of claim 6 wherein the actuator is hydraulic.

12. The pick and pass sortation system of claim 6 wherein the actuator is electrically operated.

13. The pick and pass sortation system of claim 1 further comprising at least one source of linear power, wherein power from the at least one source of linear power is transmitted to the section conveying surface to convey articles thereon.

14. The pick and pass sortation system of claim 1 wherein power from the at least one source of linear power is transmitted to the section conveying surface by a gear train.

15. A pick and pass conveyor for conveying articles thereon, the pick and pass conveyor comprising:
   a plurality of conveyors; and
      at least one conveying section comprising a divert location interposed between ends of the plurality of conveyors for receiving conveyed articles from an end of one of the plurality of conveyors and for selectively diverting the received article onto an end of one of the plurality of conveyors, the at least one conveying section comprising a plurality of section conveying surfaces each having a plurality of powered output drives outputting linear motion to define a conveying surface for conveying articles in a traveling direction thereon, each of the powered output drives of a respective one of the plurality of section conveying surfaces rotatable around a respective axis of rotation perpendicular to the conveying surface and each having a first rotational orientation perpendicular to the conveying surface for conveying articles in a first direction in response to the outputted linear motion and a second rotational orientation perpendicular to the conveying surface for conveying articles in a second direction in response to the rotational change in the outputted linear motion, wherein each of the powered drives of the respective one of the plurality of conveying surfaces is operatively coupled to an actuator that when actuated synchronously rotatably changes the orientation of operably connected drives from the first direction to the second direction, wherein the second direction is up to 360 degrees from the first direction.

16. The pick and pass sortation system of claim 15 further comprising a controller operably connected to each of the actuators to orient the plurality of section conveying surfaces to convey articles along any desired path on the at least one conveying section.

17. The pick and pass sortation system of claim 15 wherein the controller is configured to reorient the plurality of section conveying surfaces while articles are being conveyed thereon.

18. The pick and pass sortation system of claim 16 wherein the desired path is receiving articles from any of the plurality of conveyors and delivering at least one of the articles to any of the plurality of conveyors.

19. The pick and pass sortation system of claim 16 wherein the desired path is receiving articles from any of the plurality of conveyors, moving the received articles into a loop of circulating articles on at least one of the plurality of conveying sections, and discharging at least one of the received articles onto one of the conveyors.

20. The pick and pass sortation system of claim 18 wherein the desired path further comprises moving at least one article out of the loop of circulating articles and onto one of the conveyors.

21. The pick and pass sortation system of claim 18 wherein the desired path further comprises moving additional articles from one of the conveyors and into the loop of circulating articles.

22. The pick and pass sortation system of claim 18 wherein the desired path further comprises conveying articles across the loop of recirculating articles.

23. The pick and pass sortation system of claim 15 wherein articles conveyed thereon move opposite directions simultaneously on one of the conveying sections.

\* \* \* \* \*